United States Patent [19]

Kakizawa

[11] Patent Number: 4,991,203

[45] Date of Patent: Feb. 5, 1991

[54] LINE SWITCHING APPARATUS AND METHOD

[75] Inventor: Katsuhiro Kakizawa, Kawasaki, Japan

[73] Assignee: Canon Kabushiki Kaisha, Tokyo, Japan

[21] Appl. No.: 351,046

[22] Filed: May 12, 1989

[30] Foreign Application Priority Data

May 17, 1988 [JP] Japan .................................. 63-121086
Jul. 4, 1988 [JP] Japan .................................. 63-165133
Jul. 4, 1988 [JP] Japan .................................. 63-165134

[51] Int. Cl.⁵ ............................................ H04M 3/48
[52] U.S. Cl. ..................................... 379/209; 379/201
[58] Field of Search ............... 379/209, 201, 207, 208, 379/381, 257

[56] References Cited

U.S. PATENT DOCUMENTS 3,344,235  9/1967  Green et al. ..................... 379/208
4,166,929  9/1979  Sheinbein ......................... 379/207
4,759,055  7/1988  Okumura et al. ............... 379/208 X Primary Examiner—James L. Dwyer
Attorney, Agent, or Firm—Fitzpatrick, Cella, Harper & Scinto

[57] ABSTRACT

A line switching apparatus includes receiving circuitry for receiving a line-connection request signal from an extension, discriminating circuitry for determining whether a connection is possible to the line when the connection request signal is received from the receiving circuitry, sending circuitry for sending a busy signal to the extension when the discriminating circuitry determines that connection to the line is impossible, detecting circuitry for monitoring the status of the line during sending of the busy signal by the sending circuitry, and detecting that the line is in a connectable state, and alarm circuitry for informing the extension of the fact that the line has been detected to be in the connectable state by the detecting circuitry.

24 Claims, 8 Drawing Sheets

LINE SWITCHING APPARATUS AND METHOD

BACKGROUND OF THE INVENTION

1. Field of the Invention

This invention relates to a line switching apparatus and method for performing line connection between an extension and a telephone line.

2. Description of the Prior Art

Conventionally, with an apparatus of this type, such as a private branch exchange (hereinafter referred to as a "PBX") or key telephone system (hereinafter referred to as a "KTS"), so-called telephone line camp-on (or trunk cueing) is available as a service function for an extension when all telephone lines are being used. Also available is so-called extension camp-on which, when a call is to be placed on an extension, is a service function for the extension used if the extension of the other party is busy.

These service functions will now be described taking the PBX as an example.

First, in telephone line camp-on, the extension telephone is taken off the hook and "0" is dialed in order to call a telephone line. If the telephone line trunks are all busy at this time, the PBX sends a busy tone (BT) to the extension telephone. When the operator of the extension hears the BT, the operator dials a special number (a specific number) for the telephone line camp-on service and then hangs up upon confirming an intercept tone from the PBX indicating the completion of registration. When a telephone line trunk subsequently becomes available, the PBX calls the extension and the operator takes the extension telephone off the hook. When this is done, connection to the telephone line trunk is achieved.

Next, in extension camp-on, the extension telephone is taken off the hook and an extension number is dialed in order to communicate with another party's extension. If the other party's extension is busy at this time, the PBX sends the BT to the extension telephone. When the operator of the extension hears the BT, the operator dials a special number for the extension camp-on service and then hangs up upon confirming an intercept tone from the PBX indicating the completion of registration. When the busy extension subsequently becomes available, the PBX calls the registered extension telephone and the operator takes the extension telephone off the hook. When this is done, the other party's extension is called. When a response is received owing to the other party's extension being taken off the hook, connection to the other party's extension is achieved.

In the examples described above, several seconds and, in some cases, ten seconds or more are required for camp-on registration to be completed. This leads to the following disadvantages:

(1) Even if a telephone line trunk becomes available during camp-on registration, the extension being registered is made to wait if the telephone line is called (i.e., if "0" is dialed) from another extension during registration, or if the other party's extension ends communication and is taken off the hook in order to make a call.

(2) Similarly, if there is an incoming call to an available telephone line trunk from a telephone line, or if there is an incoming call to the other party's extension which has terminated a conversation, the abovementioned calling extension is made to wait.

Thus, as set forth above, there are cases where a user who has registered camp-on in order to use a telephone line trunk quickly or to rapidly communicate with another party's extension is in the end made to wait. This is highly inconvenient.

In addition, operability is poor in that even if a line becomes free during the registration operation, the user must wait until camp-on registration is completed and the call tone is issued.

Furthermore, even when a telephone line trunk becomes free and the registered extension is called after telephone line camp-on registration in the above-described example, several seconds are required until a response is received from this extension. If there is no response to the call, the telephone line trunk that is free cannot be used.

SUMMARY OF THE INVENTION

An object of the present invention is to eliminate the foregoing drawbacks encountered in the prior art.

Another object of the present invention is to improve upon a line switching apparatus and method for performing line connection between an extension and a telephone line.

Still another object of the present invention is to provide a line switching apparatus and method through which a busy telephone line trunk or extension trunk can be acquired as soon as it becomes free.

A further object of the present invention is to provide a line switching apparatus and method in which the operator of an extension is capable of recognizing the fact that a telephone line trunk has become free and can acquire the telephone line trunk immediately without the telephone line being taken possession of by a transmission from another extension or by an incoming call from a telephone line.

According to an embodiment of the present invention, the foregoing objects are attained by providing a line switching apparatus comprising receiving means for receiving a line-connection request signal from an extension, discriminating means for determining whether a connection is possible to the line when the connection request signal is received from the receiving means, sending means for sending a busy signal to the extension when the discriminating means determines that connection to the line is impossible, detecting means for monitoring the status of the line during sending of the busy signal by the sending means, and detecting that the line is in a connectable state, and alarm means for informing the extension of the fact that the line has been detected to be in the connectable state by the detecting means.

Yet another object of the present invention is to provide a line switching apparatus wherein, if the extension of a called party is busy when a call is placed to the extension, the extension on the calling side is informed, by a registering operation from this extension, of when the extension of the called party has been hung up, and wherein if the extension of the called party is hung up during the registering operation, the extension in the process of being registered is informed of the fact that the extension of the called party is being rung.

A further object of the present invention is to provide a line switching apparatus wherein, during calling of a registered extension following telephone line camp-on registration, acquisition of a freed telephone line trunk by another extension is allowed, and wherein a free telephone line trunk can be acquired immediately by re-registering telephone line camp-on.

Other features and advantages of the present invention will be apparent from the following description taken in conjunction with the accompanying drawings, in which like reference characters designate the same or similar parts throughout the figures thereof.

DESCRIPTION OF THE PREFERRED EMBODIMENTS

Embodiments of the present invention will now be described with reference to the drawings.

First Embodiment

Figure 1:
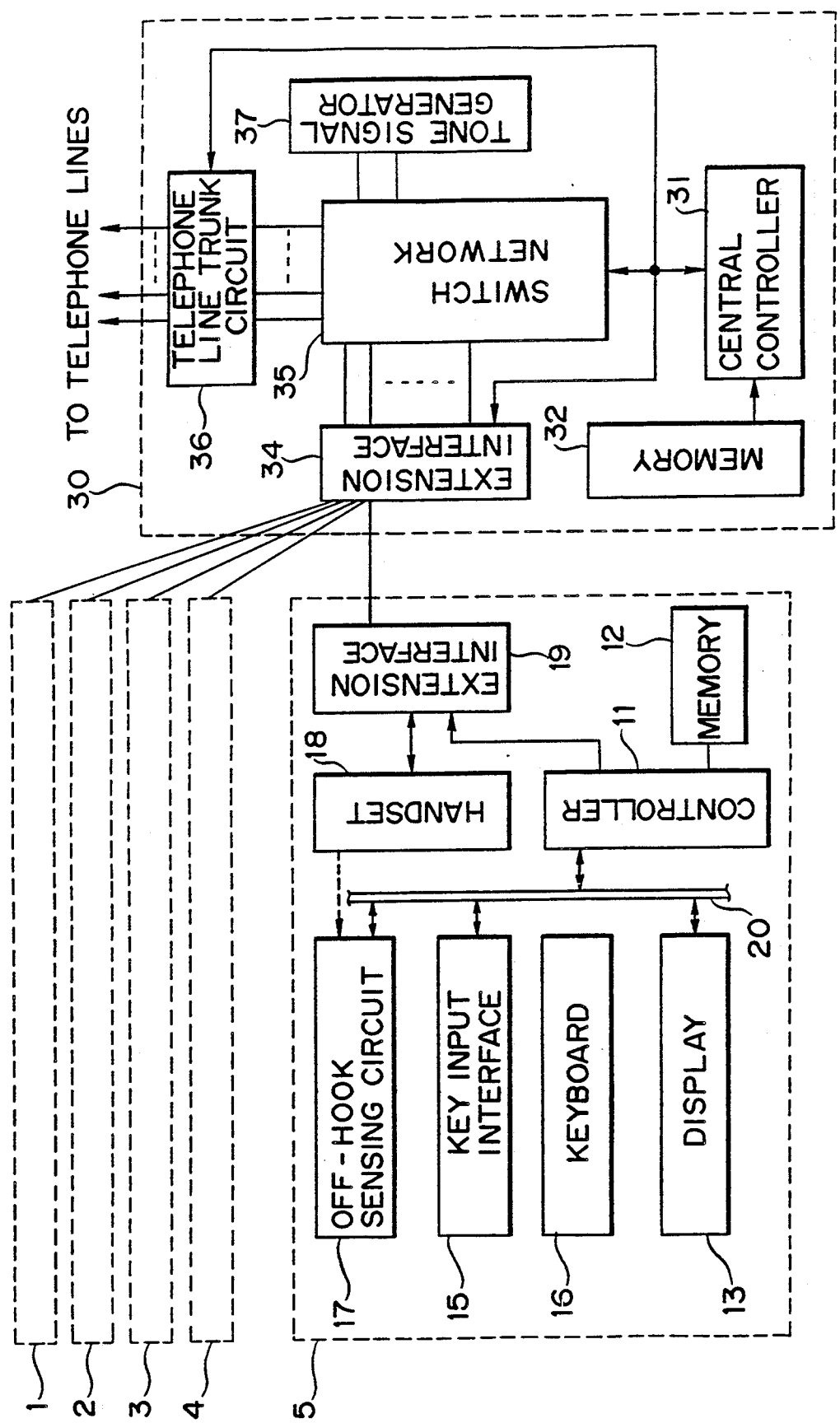
FIG. 1 is a block diagram illustrating the construction of an embodiment of the present invention.

FIG. 1 is a block diagram of a system embodying the present invention, in which numerals 1 through 5 denote telephones. Since each of the telephones has an identical construction, only telephone 5 will be described hereinafter.

The telephone 5 includes a controller 11 for executing processing in accordance with inputs from a keyboard 16, as well as overall control of the telephone in this embodiment, a memory 12 for storing control data used to control the controller 11, and a display unit for presenting various displays, such as a display indicating that a trunk circuit interfacing telephone lines is in the busy state. The telephone 5 further includes a key input interface 15 for administering the interface with the keyboard 16. The keyboard 16 comprises various keys, such as a ten-key pad for entering telephone numbers. Numeral 17 denotes an off-hook sensing circuit for sensing that a telephone handset 18 is on or off the hook. Also provided in the telephone 5 are an extension interface 19 for administering interfacing between the telephone proper and a switching unit 30, and an internal bus 20 which connects the controller 11 to the other components.

The switching unit 30, which is for performing connection control to effect connection between a plurality of telephone lines (outside telephone lines) or connection extension between a number of extension telephones, generally corresponds to a private branch exchange (PBX) or key telephone system (KTS). The switching unit 30 includes a central controller 31 for executing overall control of the switching unit 30 in accordance with a program stored in a memory (ROM) 32 which, in addition to the abovementioned program, stores various parameters and various control data relating to each connected device, an extension interface 34 for interfacing each connected device and monitoring the status of each extension, a switch network 35 for effecting connection/changeover between the telephone lines (pay stations) and the devices connected to the extensions, a trunk circuit 36 for interfacing the telephone lines, and a tone signal generating circuit serving as a tone source for a busy tone (BT) when the telephone line trunk circuit 36 is busy, as well as a tone source for a dial tone (DT) when the telephone line trunk circuit becomes free.

Figure 2:
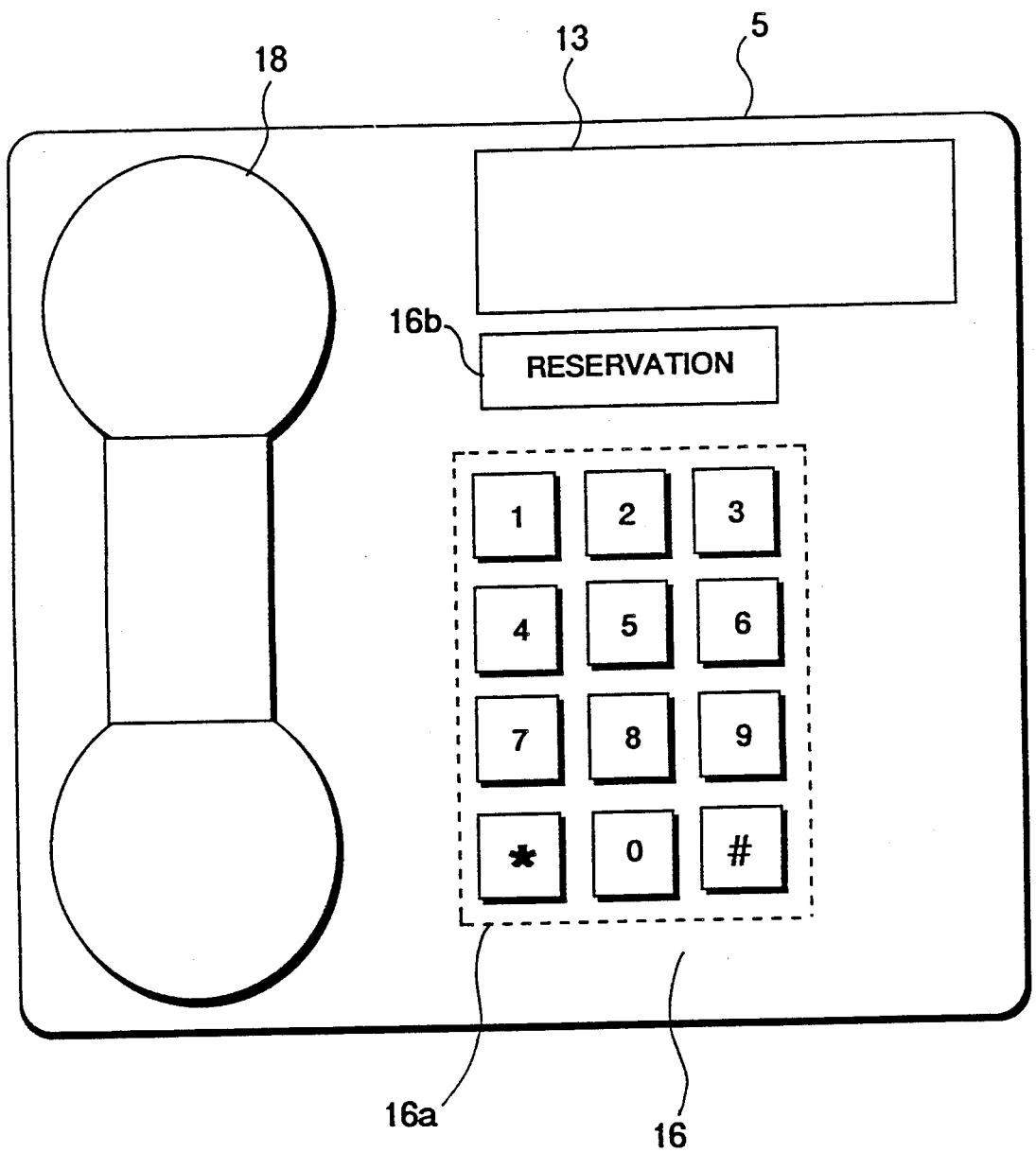
FIG. 2 is an external view of a telephone in the present embodiment.

FIG. 2 is an external view of the telephone in the embodiment constructed as set forth above.

The display unit 13 shown in FIG. 2 is of the seven-segment type, though it is not limited thereto and can employ a liquid-crystal display device if desired. The keyboard 16 includes telephone-number keys 16a for entering telephone numbers, and a reservation key 16b for making a reservation when the telephone line trunk is busy. An arrangement can be adopted in which reservation is made from the telephone-number keys 16a. Numeral 18 denotes the aforementioned handset.

Figure 3A:
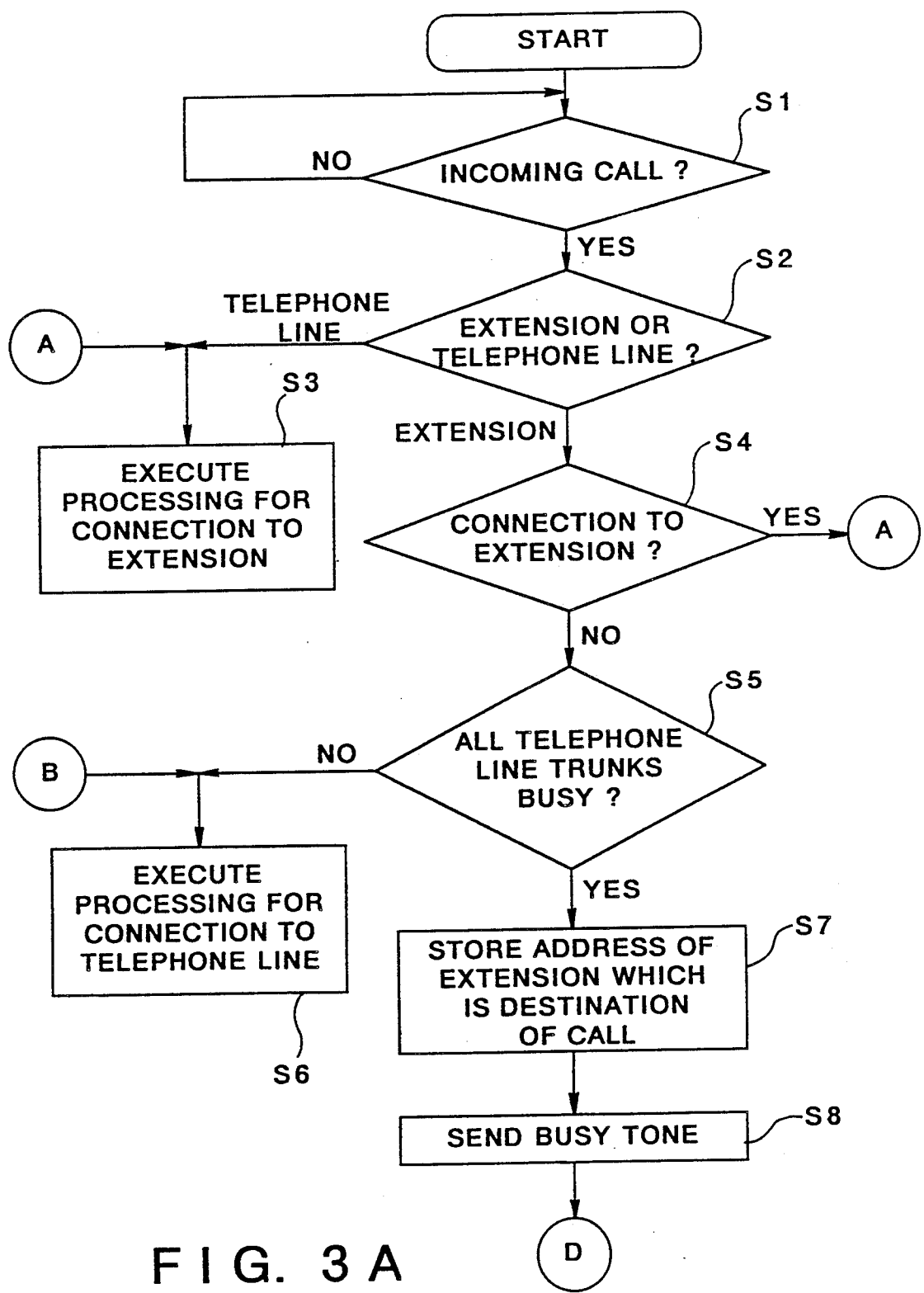
FIGS. 3A, 3B are call control flowcharts according to the present embodiment.
Figure 3B:
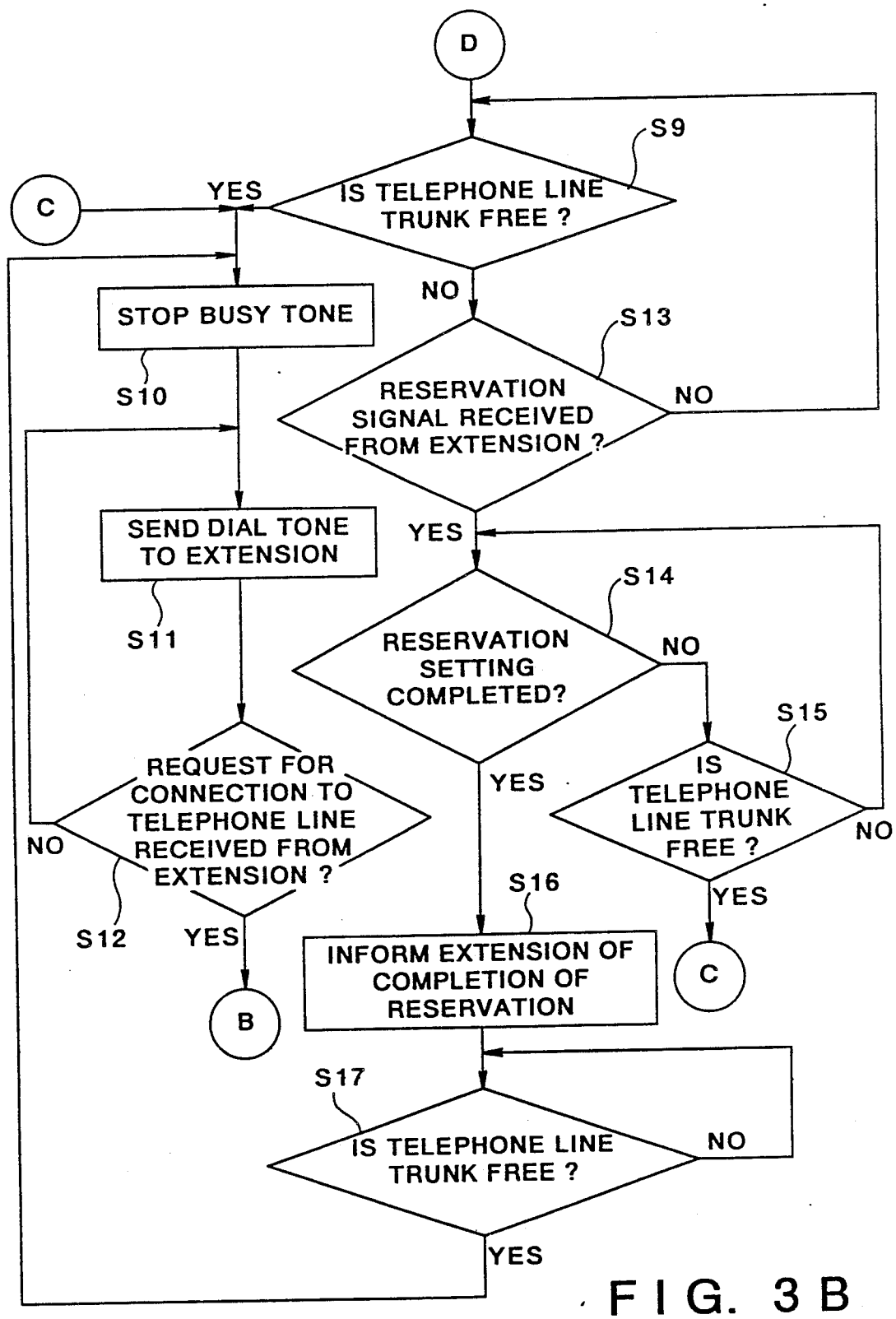

FIGS. 3A, 3B are control flowcharts executed by the switching unit 30 of the present embodiment. It should be noted that this control is executed by the central controller 31 in accordance with the program stored in the memory 32.

First, it is determined at step S1 whether the switching unit 30 has received a call. If the answer is YES, the program proceeds to step S2. It is determined at this step whether the call is in the extension interface 34 or the telephone line trunk circuit 36. If the call is from a telephone line, the program proceeds to step S3, where processing is executed to make the connection to the designated extension. If the call is determined to have been received in the extension interface 34 at step S2, then the program proceeds to step S4, at which it is determined if the destination of the connection is an extension. If the answer is YES, then the program proceeds to the step S3, where processing is executed to make the connection to the designated extension. If it is determined at step S4 that the connection is not destined for an extension, namely that the connection is to be made to a telephone line, then the program proceeds to step S5. It should be noted that if the operator of telephone 5 uses a telephone line, it will suffice to take the handset 18 off the hook and dial "0" using the ten-key pad 16a. In a case where the switching unit 30 receives "0" from the telephone, it is capable of determining that the telephone has selected use of the telephone line.

It is determined at step S5 whether all telephone lines of the telephone line trunk circuit 36 are being used. When a telephone line is free for use, the program proceeds to step S6, at which processing is executed to connect the extension to the telephone line designated by dialing.

If it is determined at step S5 that all telephone lines are being used, the program proceeds to step S7. Here the telephone at which "0" was dialed is detected and the address of this extension is stored in the memory 32, after which the program proceeds to step S8. It should be noted that storage of the address in the memory 32 can also be achieved by preserving the connection to the telephone called by means of the switch network 35. The step S8 calls for a busy tone to be sent to the telephone whose extension address has been stored in the memory 32, or to the telephone whose extension connection is preserved. The busy tone is generated by the tone signal generating circuit 37.

The telephone 5 receives this busy tone via the extension 18 and is capable of being heard by the operator over the handset 18. Upon detecting this busy tone, the controller 11 causes the display unit 13 to present the busy display.

It is determined at step S9 whether a line has become available in the telephone line trunk circuit 36. If the answer is YES, then the program proceeds to step S10, at which the busy tone is stopped, and then to step S11.

Step 11 calls for a dial tone to be sent to the extension. The operator of the extension telephone thus is made aware of the fact that the busy state has ended. Also, in response to reception of the dial tone, the display indicating the busy state vanishes from the display unit 13 of the telephone 5.

It is determined at step S12 whether a request for connecting the extension to the telephone line has been received from the extension. If the request has been received, the program proceeds to step S6, at which processing is executed to effect the connection to the telephone line. If there is no connection request, on the other hand, the program returns to the step S11 and the dial tone is issued. The dial tone will cease when the telephone handset is hung up.

If it is found at the step S9 that there are no free telephone lines in the telephone line trunk, then the program proceeds to step S13. Here it is determined whether a telephone-line reservation signal has been received from the extension telephone. The program proceeds to the step S9 if the reservation signal has not been received, and to step S14 if it has. It should be noted that the reservation for the telephone line is made by using the reservation key 16b of telephone 5 shown in FIG. 2. The telephone-line reservation can also be made by dialing in a special number for camp-on.

It is determined at the step S14 whether setting of the reservation has been completed in the switching unit 30. Step S15 calls for a determination as to whether a telephone line trunk has become available before completion of the reservation setting operation. If the answer is YES, then the program proceeds to the step S10. When setting of the reservation is completed, the program proceeds to step S16 to inform the extension of the fact. The handset can be hung up at the telephone that has been so notified.

Step S17 calls for a determination as to whether a telephone line trunk has become free after completion of the telephone-line reservation setting operation. The program proceeds to the step S4 if a telephone line has become available.

Thus, in accordance with the present embodiment, if all of the telephone lines are being used, an extension is notified of a freed telephone line just as soon as one becomes available. This enables the operator to immediately ascertain the freed state and to make the connection between the extension and the free line in a rapid manner.

Moreover, if a telephone line becomes available before completion of telephone-line reservation from the extension, the operator is capable of recognizing the fact that the telephone line has become available. Accordingly, the operator can prevent this telephone line from being taken possession of by a call from another extension or line during the course of telephone-line reservation.

Further, in the foregoing embodiment, connection to one extension is described. However, in a case where calls are made from a plurality of extensions at a time during which all of the telephone lines are being used, it is possible to inform of freed telephone lines in the order in which the calls were made as the telephone lines become available.

It should be noted that while the foregoing embodiment has been described for a case where telephones are connected as extensions, facsimile devices can also be connected. In such case, by providing a facsimile device with an automatic dialing function, it can be arranged for a document to be transmitted from the facsimile device automatically as soon as a telephone line is freed.

Thus, in accordance with the present invention as described above, the operator of an extension is capable of immediately recognizing when a telephone line trunk has become available so that this telephone line trunk can be quickly acquired without it becoming occupied by a transmission from another extension or incoming call from a telephone line.

Second Embodiment

In the foregoing embodiment, a case has been described in which a telephone line trunk that is in use becomes free during registration of telephone line camp-on. However, the invention is not limited to this embodiment, for it is possible to apply the invention to a case where the extension of a called party makes a transition from the busy to the freed state when a call is placed from a calling extension.

A second embodiment of the switching apparatus of the invention will now be described in detail with reference to FIG. 4 and FIGS. 5A, 5B, in which the invention is applied to an extension camp-on function.

Figure 4:
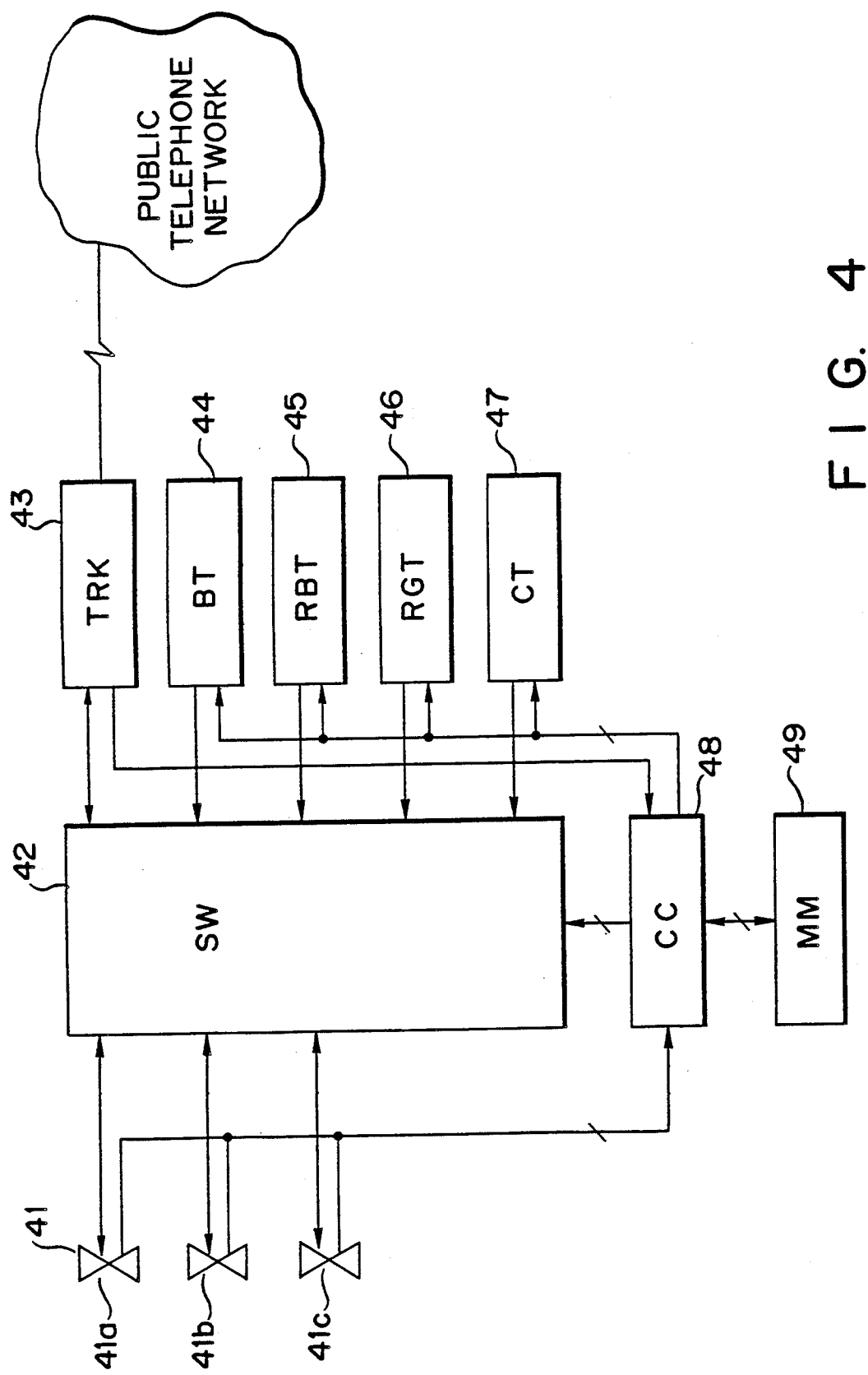
FIG. 4 is a block diagram illustrating the construction of a second embodiment of the present invention.
Figure 5A:
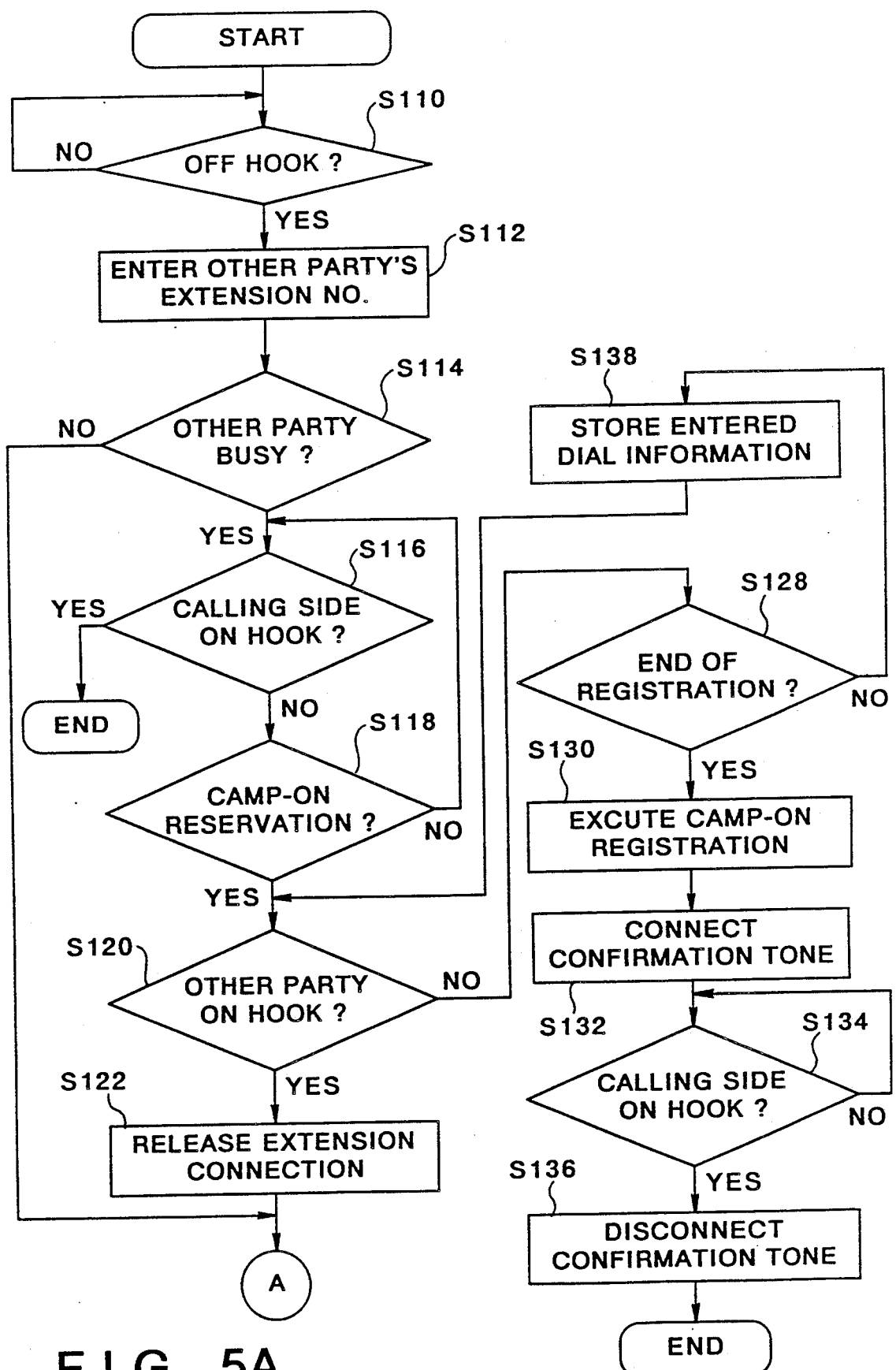
FIGS. 5A, 5B are extension camp-on control flowcharts according to the second embodiment of the invention.
Figure 5B:
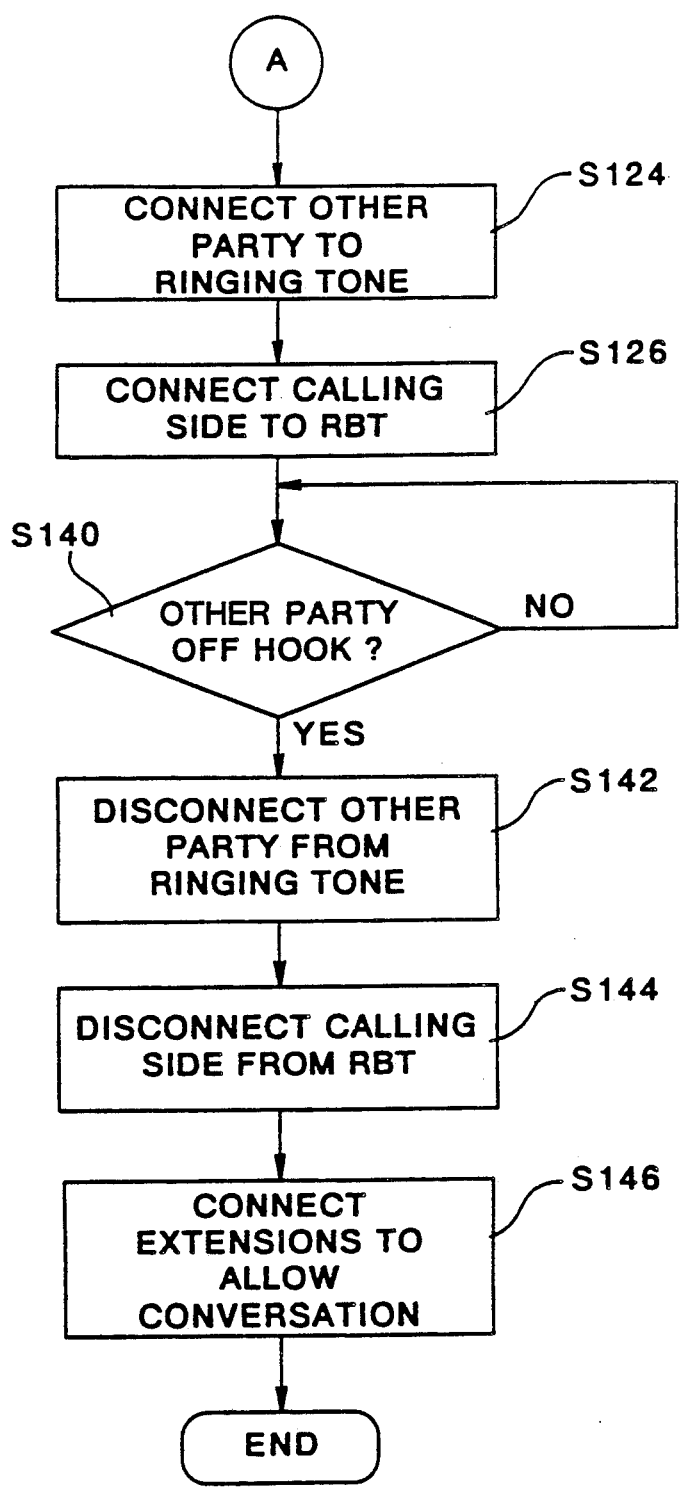

FIG. 4 is a block diagram illustrating the construction of the second embodiment. Shown in FIG. 4 are an extension telephone 4, a switch network 42, a trunk (TRK) 43, a source 44 of a busy tone (BT), a source 45 of a ring-back tone (RBT), a source 46 of a ringing tone (RGT), a source 47 of a configuration tone (CT), a central controller (CC) 48, and a memory (MM) 49.

The central controller 48 in this embodiment comprises a CPU for controlling the overall apparatus, and a ROM storing the processing procedure of the CPU. The memory 49 comprises a table which, when an extension camp-on registering operation is carried out, stores the calling extension number and the called extension number. Each extension telephone 41 is a push-button telephone which provides the CC 48 with hook information and dial information separately of a voice signal. The tone sources 44–47 are connected to the switch network 42 under the control of the central controller 48 and thus deliver their outputs to the connected extension telephone 41 in order to inform it of the state of the apparatus. For example, when a call arrives at TRK 43 via public telephone network, the TRK detects the incoming call and outputs an incoming call signal to the CC 48. In response, in order to notify the extension telephone 41 of the incoming call state, the CC 48 connects the RGT 46 to the extension telephone 41 corresponding to the called trunk 43 by way of the switch network 42. The extension telephone 41 is rung by the ringing tone signal from the RGT 46. If the TRK 43 is busy when a call request (a special number for acquisition of the TRK 43) enters the public telephone network from the extension telephone 41, the extension telephone 41 which made the call request and the BT 44 are connected by the switch network 42 and the extension telephone is informed of the fact that the TRK is busy.

Processing from registration of the extension camp-on function until conversation between the parties is achieved will now be described in accordance with the flowcharts of FIGS. 5A and 5B.

First, let 41a represent an extension telephone connected to extension number "1", 41b an extension telephone connected to extension number "2", and 41c an extension telephone connected to extension number "3", and assume that the extension telephones 41b, 41c are communicating when the extension telephone 41a dials extension telephone number "2".

When the central controller 48 enters off-hook information from the extension telephone 41a at step S110, processing proceeds to step S112, where the extension number "2" dialed in is entered. The status of the other party's extension telephone 41b corresponding to the entered extension number "2" is investigated at step S114. If the extension telephone 41b is busy, the program proceeds to step S116. Here the BT 44 is connected to the switch network 42, the calling intersection telephone 41a is notified that the called party is busy, and input information from the calling side is awaited. If this information is not on-hook information which ends processing, the program proceeds to step S118, where it is determined whether the information is a special number for extension camp-on registration, namely the number for registering the extension camp-on function. If the entered dial information is not the special number for extension camp-on, the program returns to the step S116. If it is the special number for extension camp-on, the program proceeds to step S120, at which it is determined, by on-hook information, whether the called extension telephone 41b has finished communicating. If communication has not ended, the program proceeds to step S128, at which the operation for registering extension camp-on is continued.

If the called extension telephone 41b is hung up, however, the switch network 42 is freed and processing for ending the conversation is executed at step S122. Next, at step S124, the other party's extension telephone 41b and the RGT 46 are connected via the switch network 42, after which the extension telephone 41a, which is performing the extension camp-on registering operation, is connected to the RBT 45 at step S126 to notify the extension telephone 41a that the conversation has ended. Next, a response from the extension telephone 41b being called is judged based on off-hook information at step S140. If a response is received, an output is delivered to the switch network 42 to end the connection between the called extension telephone 41b and the RGT 46 at step S142. Similarly, an output is delivered to the switch network 42 to end the connection between the extension telephone 41a and the RBT 45 at step S144. Next at step S146, an output is delivered to the switch network 42 to connect the extensions at step S146, whereby the extension telephone 41a and extension telephone 41b are brought into communication.

Accordingly, if the other party's extension telephone is hung up during the extension camp-on registering operation, the calling party performing extension camp-on registration is notified that the other party has hung up and a transition can be made to the communicating state between the extensions.

If it is found at the step S120 that the called extension telephone 41b has not finished communicating, then it is determined at step S128 whether end of the extension camp-on registering operation has been entered. If registration has not ended, the entered dial information is stored in the MM 49 and processing returns to the step S120 in order that the registering operation may proceed. If an input indicating the end of registration is entered at step S128, however, extension camp-on registration processing is executed at step S130. In order to output the confirmation tone (CT) 47 to the registered extension telephone 41a, the switch network 42 and extension telephone 41 are connected at step S132. On-hook information ending the registration operation is awaited at step S134. If on-hook information is received, confirmation tone connection release is outputted to the switch network 42 to end the extension camp-on registering operation.

In the second embodiment, setting is performed by the special dial number for extension camp-on. However, this setting may be made by a function key having the same meaning.

It is also possible to adopt an arrangement in which, when the calling party performing the registering operation is notified that the other party's extension is on the hook, the registering operation is suspended and the calling party is informed of the fact that the other party's extension is being called by a special tone or recorded voice rather than by the RBT.

Further, rather than using a tone, the extension telephone can be provided with a display device to give notification to the user visually.

In accordance with the second embodiment described above, if the other party's extension telephone is hung up during the camp-on registering operation, this extension is called immediately and the RBT tone is sent in place of the confirmation tone to the extension that is performing the registering operation, whereby the calling party is capable of interrupting the registering operation and of being notified that the connection has been made to the other party's extension. As a result, operability is improved and it is possible to achieve rapid communication between the extensions.

Figure 6:
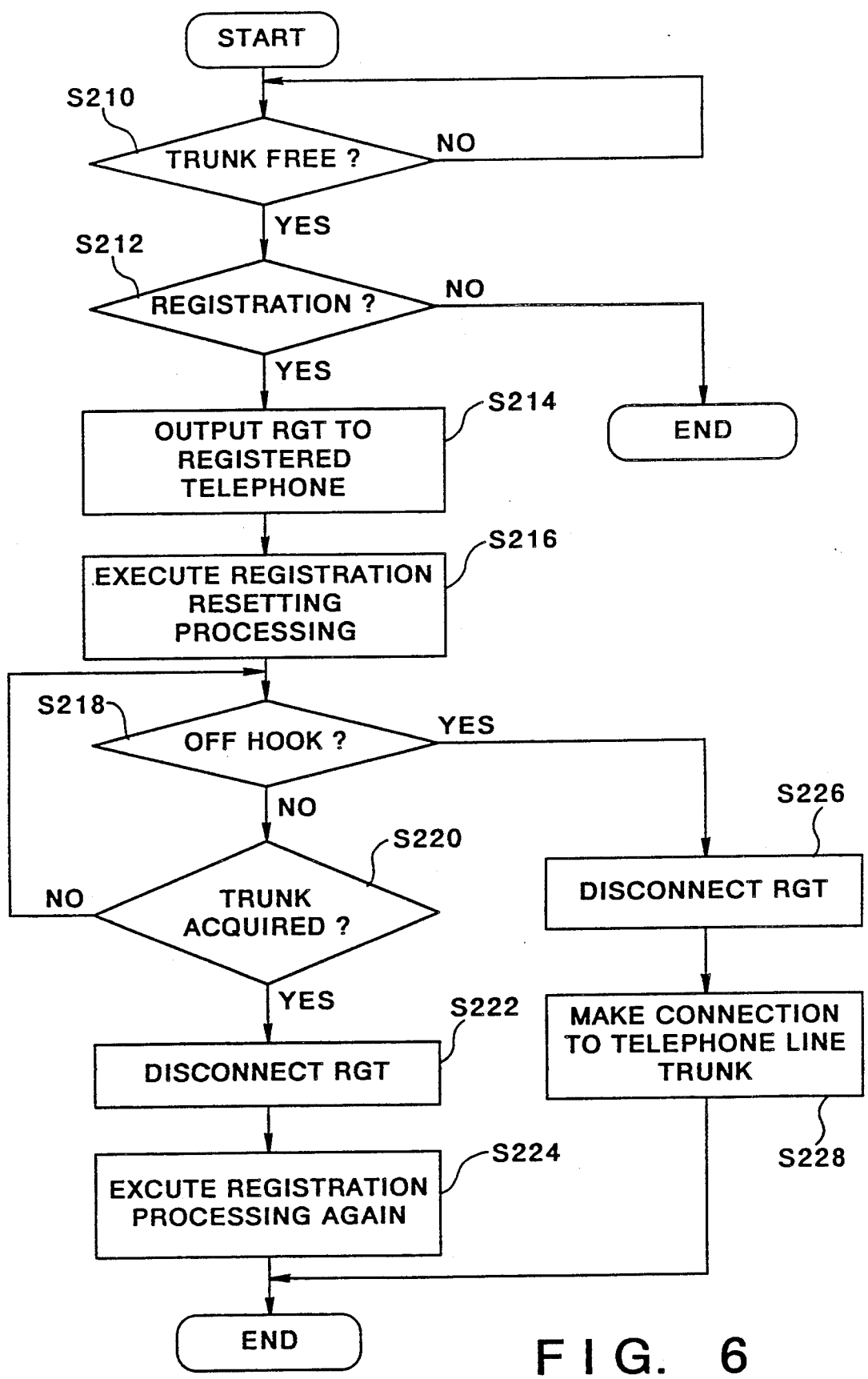
FIG. 6 is a telephone line camp-on control flowchart of a modification of the second embodiment of the invention.

Reference will now be had to the flowchart of FIG. 6 to describe a processing procedure in which, after telephone line camp-on registration from an extension is completed, acquisition of the telephone line from another line is allowed and re-registration is carried out in the second embodiment shown in FIG. 4.

First, it is determined at step S210 whether the trunk TRK 43 is free. If the answer is YES, the program proceeds to step S202. Here it is determined from a registration table in the memory MM 49 whether there is an extension that has executed telephone line camp-on registration. If the answer is NO, processing is terminated; if YES, the program proceeds to step S214, where the extension of the extension telephone 41 that has executed the registration operation and the RGT 46 are connected via the switch network 42 to inform the registering extension telephone 41 of the fact that the TRK 43 is free. Next, resetting of the registration is performed at step S216 and it is determined at step S218, based on off-hook information, whether there is a response from the extension telephone 41. If there is no response, input information from other extension telephones is investigated at step S220 and the program proceeds to step S222 if input information is a special number for telephone line acquisition, namely for acquiring the TRK 43. If there is no input indicative of the special number for telephone line acquisition, the program returns to the step S218 and a response is awaited. At step S222, disconnection from RGT 46 is outputted to the switch network 42 in order to inform the extension telephone 41 that has effected registration of the fact that another extension telephone has acquired the TRK 43. This is followed by step S224, at which, in order for the extension telephone 41 to perform telephone-line camp-on registration again, the extension number is registered in the registration table in MM 49. Processing is then terminated.

If it is found at the step S218 that there is a response from the extension telephone 41 that has performed registration, release of connection to RGT 46 is outputted to the switch network 42 in order to stop the RGT 46. Connection between the free TRK 43 and the extension is outputted to the switch network 42 at step S228 and processing is terminated.

Thus, in the modification of the second embodiment described above, the extension telephone that has effected telephone line camp-on registration is notified, while it is being rung, of trunk acquisition by termination of the ringing tone (RGT). However, notification can be given by transmitting a special tone for a short period of time. In another option, it is permissible to provide the extension telephone with a display device. In such case the device would display "CAMP-ON CALL IN PROGRESS" during sounding of the ringing tone and "CAMP-ON STANDBY" when the trunk has been acquired. Notification of a change in status may thus be given visually.

In a case where a trunk is acquired during the call for telephone line camp-on, the call is stopped and telephone line camp-on is re-registered automatically. As a result, operability in terms of acquiring the telephone line trunk from an extension is improved and so is the efficiency of line utilization.

SUMMARY

If a call request for a call to a telephone line is received from a first extension and the telephone line is busy, or if a request for conversation with a second extension is received from the first extension and the second extension is busy, a busy signal is sent to the first extension. If the telephone line or second extension becomes free during transmission of the busy signal, the first extension is so informed, thereby enabling the connection between the first extension and the telephone line or the second extension to be made in prompt fashion.

As many apparently widely different embodiments of the present invention can be made without departing from the spirit and scope thereof, it is to be understood that the invention is not limited to the specific embodiments thereof except as defined in the appended claims.

What is claimed is:

1. A line switching apparatus for performing line connection between an extension and a line, comprising:
   receiving means for receiving a line-connection request signal from an extension;
   discriminating means for determining whether a connection is possible to the line when the connection request signal is received from said receiving means;
   sending means for sending a busy signal to the extension when said discriminating means determines that connection to the line is impossible;
   detecting means for monitoring the status of the line during sending of the busy signal by said sending means, and detecting that the line is in a connectable state; and
   alarm means for informing the extension of the fact that the line has been detected to be in the connectable state by said detecting means.

2. The apparatus according to claim 1, wherein said line comprises a telephone line.

3. The apparatus according to claim 1, wherein said line is connectable to another extension.

4. The apparatus according to claim 2, wherein when there is no response from said extension and, moreover, a connection request signal is received from another line while said extension is being informed of the connectable state by said alarm means, said extension is informed of a non-connectable state, the status of the telephone line is monitored again and the connectable state is detected.

5. The apparatus according to claim 2, wherein said connectable state includes a tone signal which indicates that the telephone line is free.

6. The apparatus according to claim 5, wherein said tone signal is a dial tone.

7. The apparatus according to claim 3, wherein said connectable state includes a tone signal which indicates that the other extension is on the hook.

8. The apparatus according to claim 7, wherein said tone signal is a ring-back tone.

9. The apparatus according to claim 4, wherein said connectable state includes a tone signal which indicates that the telephone line is free.

10. The apparatus according to claim 9, wherein said tone signal is a ring-back tone.

11. The apparatus according to claim 2, wherein said connectable state includes display information which indicates that the telephone line is free.

12. The apparatus according to claim 3, wherein said connectable state includes display information which indicates that the other extension is on the hook.

13. The apparatus according to claim 4, wherein said connectable state includes display information which indicates that the telephone line is free.

14. A line switching method for performing line connection between an extension and a line, comprising:
   a receiving step of receiving a line-connection request signal from an extension;
   a discriminating stp of determining whether a connection is possible to the line when the connection request signal is received at said receiving step;
   a sending step of sending a busy signal to the extension when it is determined at said discriminating step that connection to the line is impossible;
   a detecting stp of monitoring the status of the line during sending of the busy signal at said sending step, and detecting that the line is in a connection state; and
   an alarming step of informing the extension of the fact that the line has been detected to be in the connectable state at said detecting step.

15. The method according to claim 14, wherein said line comprises a telephone line.

16. The apparatus according to claim 14, wherein said line is connectable to another extension.

17. The apparatus according to claim 15, wherein when there is no response from said extension and, moreover, a connection request signal is received from another line while said extension is being informed of the connectable state at said alarm step, said extension is informed of a non-connectable state, the status of the telephone line is monitored again and the connectable state is detected.

18. A telephone device connected to a line switching apparatus, comprising:
   means for requesting connection of a line to said line switching apparatus;

input means for inputting a line reservation when said line is busy; and alarm means for informing of the fact that said line is no longer busy before the input from said input means is completed.

19. The device according to claim 18, wherein said line comprises a telephone line.

20. The device according to claim 18, wherein said line is connectable to another extension.

21. The device according to claim 18, wherein said alarm means informs of the fact that said line is no longer busy based on a signal sent from said line switching apparatus.

22. A line switching apparatus comprising:

means for registering telephone line reservation from an extension when all of a plurality of telephone lines are busy;

means for alarming the extension that has made the reservation of the fact that a telephone line has become free when one of the busy telephone lines becomes free; and means for allowing one of the telephone lines to be used outside of said extension while a response to said alarm is awaited from said extension.

23. The apparatus according to claim 22, further comprising means for alarming said extension of the fact that the telephone line has been allowed to be used by another line when said other line is allowed to use said telephone line.

24. The apparatus according to claim 23, wherein said registering means registers reservation of the telephone line from said extension again when said allowing means allows the telephone line to be used by another line.

* * * * *

UNITED STATES PATENT AND TRADEMARK OFFICE
CERTIFICATE OF CORRECTION

PATENT NO.   : 4,991,203
DATED        : February 5, 1991
INVENTOR(S)  : KATSUHIRO KAKIZAWA It is certified that error appears in the above-identified patent and that said Letters Patent is hereby corrected as shown below:

COLUMN 10

Line 39, "discriminating stp" should read --discriminating step--.
Line 45, "detecting stp" should read --detecting step--.

Signed and Sealed this

Thirtieth Day of March, 1993

Attest:

STEPHEN G. KUNIN

*Attesting Officer*         *Acting Commissioner of Patents and Trademarks*